(12) United States Patent
Mao et al.

(10) Patent No.: US 10,759,050 B2
(45) Date of Patent: Sep. 1, 2020

(54) ROBOT OFF-LINE PROGRAMMING METHOD AND APPARATUS USING THE SAME

(71) Applicant: ABB Schweiz AG, Baden (CH)

(72) Inventors: Lei Mao, Shanghai (CN); Shaojie Cheng, Shanghai (CN); Peng Kong, Shanghai (CN)

(73) Assignee: ABB Schweiz AG, Baden (CH)

(*) Notice: Subject to any disclaimer, the term of this patent is extended or adjusted under 35 U.S.C. 154(b) by 271 days.

(21) Appl. No.: 15/950,457

(22) Filed: Apr. 11, 2018

(65) Prior Publication Data
US 2018/0229369 A1    Aug. 16, 2018

Related U.S. Application Data

(63) Continuation of application No. PCT/CN2015/097084, filed on Dec. 11, 2015.

(51) Int. Cl.
*B25J 9/16* (2006.01)
*G05B 19/19* (2006.01)
(Continued)

(52) U.S. Cl.
CPC ........... *B25J 9/1664* (2013.01); *B25J 9/1671* (2013.01); *G05B 19/19* (2013.01); *G05B 19/408* (2013.01);
(Continued)

(58) Field of Classification Search
CPC . B25J 9/1692; B25J 9/1664; B25J 9/10; B25J 9/1638; B25J 9/1643; B25J 9/1671;
(Continued)

(56) References Cited

U.S. PATENT DOCUMENTS 5,590,034 A * 12/1996 Snell .................. B25J 9/1643
                                                      318/568.19
6,584,379 B1    6/2003 Mukai et al.
(Continued)

FOREIGN PATENT DOCUMENTS

CN       1802240 A    7/2006
CN     101204813 A    6/2008
(Continued)

OTHER PUBLICATIONS

Chinese Search Report dated Oct. 22, 2019 issued in Chinese Application No. 201580083737.7 (4 pages).
(Continued)

*Primary Examiner* — Ryan Rink
(74) *Attorney, Agent, or Firm* — Taft, Stettinius & Hollister LLP; J. Bruce Schelkopf

(57) ABSTRACT

A robot off-line programming method. The method includes: respectively obtaining a first data representing positions and orientations of the plurality of targets on at least one work piece, a second data representing position of the at least one work piece, a third data representing geometry of a tool, and a fourth data representing the tool position and orientation with respect to an end of the robot; obtaining the robot path for which the tool tip passes through the plurality of the targets on the at least one work piece; using a function of an inverse kinematics for the robot model in consideration of the first data, the second data, the third data and the fourth data, calculating how many of the targets on the obtained robot path are reachable to the tool in relation to various rotation angle of the tool around the tool axis within a predetermined range so as to comply with optimization criteria. With the automatic calculation and intuitive preview, users could get to know directly about how many targets can be processed actually on a robot path. If the reachability is unsatisfied, the users could also have chances
(Continued)

to modify the settings to obtain a more reasonable and precise path. An apparatus for implementing the method is also disclosed.

20 Claims, 2 Drawing Sheets

(51) Int. Cl.
*G05B 19/427* (2006.01)
*G05B 19/408* (2006.01)

(52) U.S. Cl.
CPC .. *G05B 19/427* (2013.01); *G05B 2219/36133* (2013.01); *Y10S 901/02* (2013.01)

(58) Field of Classification Search
CPC .............. B25J 9/1697; G05B 19/4103; G05B 2219/43162; G05B 2219/50353; G05B 19/19; G05B 19/408; G05B 19/4083; G05B 19/423; G05B 19/427; G05B 2219/34083; G05B 2219/36133; G05B 2219/36504; G05B 2219/37134; G05B 2219/37542; G05B 2219/39021; G05B 2219/39022; G05B 2219/39081; G05B 2219/40004; G05B 2219/40053; G05B 2219/40328; G05B 2219/40333; G05B 2219/40588; G05B 2219/45104
See application file for complete search history.

(56) References Cited

U.S. PATENT DOCUMENTS

| | | | | |
|---|---|---|---|---|
| 8,543,611 | B1* | 9/2013 | Mirtich | G06F 7/00 707/794 |
| 8,918,210 | B2 | 12/2014 | Kagawa | |
| 2004/0251866 | A1* | 12/2004 | Gan | B25J 9/1692 318/568.11 |
| 2005/0004709 | A1* | 1/2005 | Watanabe | B25J 9/1664 700/245 |
| 2009/0248203 | A1 | 10/2009 | Nakamura et al. | |
| 2012/0259462 | A1 | 10/2012 | Aoba | |
| 2013/0338827 | A1 | 12/2013 | One et al. | |
| 2014/0277736 | A1* | 9/2014 | Itkowitz | B25J 9/1697 700/259 |
| 2019/0077016 | A1* | 3/2019 | Atohira | B25J 9/1605 |
| 2019/0221037 | A1* | 7/2019 | Sugaya | B25J 9/1671 |
| 2019/0358824 | A1* | 11/2019 | Takeuchi | B25J 13/085 |

FOREIGN PATENT DOCUMENTS

| | | |
|---|---|---|
| CN | 104331547 A | 2/2015 |
| EP | 0672507 A1 | 9/1995 |
| EP | 0938954 A2 | 9/1999 |
| EP | 1498792 A2 | 1/2005 |
| JP | H0329419 A | 2/1991 |
| JP | 03294194 A | 12/1991 |
| JP | H048486 A | 1/1992 |
| JP | 09225872 A | 9/1997 |
| JP | 4008486 B2 | 11/2007 |
| JP | 5458769 B2 | 4/2014 |
| JP | 5804367 B2 | 11/2015 |

OTHER PUBLICATIONS

State Intellectual Property Office of the P.R. China, International Search Report & Written Opinion issued in corresponding Application No. PCT/CN2015/097084, dated Jun. 24, 2016, 9 pp.
Chinese Patent Office, First Office Action issued in corresponding Chinese application No. 201580083737.7, dated Oct. 30, 2019, 4 pp.
Japanese Office Action, Japanese Patent Application No. 2018-518571, dated Mar. 20, 2019 8 pages including English translation.
Extended European Search Report, European Patent Application No. 15910080.9, dated Jul. 1, 2019, 9 pages.
Mitsi S. et al., "Off-line Programming of an Industrial Robot for Manufacturing", The International Journal of Advanced Manufacturing Technology, Springer, Berlin, DE, vol. 26, No. 3, Aug. 1, 2005, pp. 262-267.
Arun Gowtham Gudla, "A methodology to Determine the Functional Workspace of a 6R Robot Using Forward Kinematics and Geometrical Methods", Electronic Theses and Dissertations—Theses, Dissertations and Major Papers, Sep. 17, 2012, pates 1-101.

* cited by examiner

ROBOT OFF-LINE PROGRAMMING METHOD AND APPARATUS USING THE SAME

TECHNICAL FIELD

The invention relates to robot off-line programming, and more particularly to robot off-line programming have a function of obtaining an optimum robot path.

BACKGROUND ART

Robot off-line programming system is known to the public for performing robot path generation. When off-line programming a robot for path generation, generally several factors are considered, such as tool settings, form of the to-be-machined work pieces, and robot positions, and so on. Based on the actual settings of these factors, machining targets can be determined to ensure the tool grasped by the robot could process an accurate machining while following the robot path. The more targets on the robot path could be machined, the better the machining effect achieves. After the basic settings like machining surface parameters and tool settings are set, the system generates a robot path with several targets. Each target has a defined coordinate. When the robot requires to process on a specific target, the robot follows a certain strategy, together with the coordinate information of the target, to adjust its orientation, which ensures the target can be machined.

However, even when a robot off-line programming is done to satisfy the conditions as mentioned above, it is not rare that problems occur such that some of the targets cannot be reached by the robot to process assuming certain postures, due to limited working range This will affect the machining effects and accuracy, and as a result, unexpected time and cost is required to build the robot system.

BRIEF SUMMARY OF THE INVENTION

According to an aspect of the invention, it provides a robot off-line programming method, including: respectively obtaining a first data representing positions and orientations of the plurality of targets on at least one work piece, a second data representing position of the at least one work piece, a third data representing geometry of a tool, and a fourth data representing the tool position and orientation with respect to an end of the robot; obtaining the robot path for which the tool tip passes through the plurality of the targets on the at least one work piece; using a function of an inverse kinematics for the robot model in consideration of the first data, the second data, the third data and the fourth data, calculating how many of the targets on the obtained robot path are reachable to the tool in relation to various rotation angle of the tool around the tool axis within a predetermined range so as to comply with optimisation criteria; and presenting the relation as a result of the calculation on an human-machine-interface.

According to another aspect of present invention, it provides a robot off-line programming apparatus, including: a processor, a memory and a human-machine-interface, wherein the processor, the memory and the human-machine-interface are adapted to perform the method as above.

With the automatic calculation and intuitive preview, users could get to know directly about how many targets can be processed actually on a robot path. If the reachability is unsatisfied, the users could also have chances to modify the settings to obtain a more reasonable and precise path. The relationship between the rotation angle of the robot and the reachable target rate could also facilitate the users to have a better known about how to effectively adjust the robot orientation. The preview function also help the users observe desired robot orientation.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods and programming procedures, devices, and circuits are omitted so not to obscure the description of the present invention with unnecessary detail.

Figure 1:
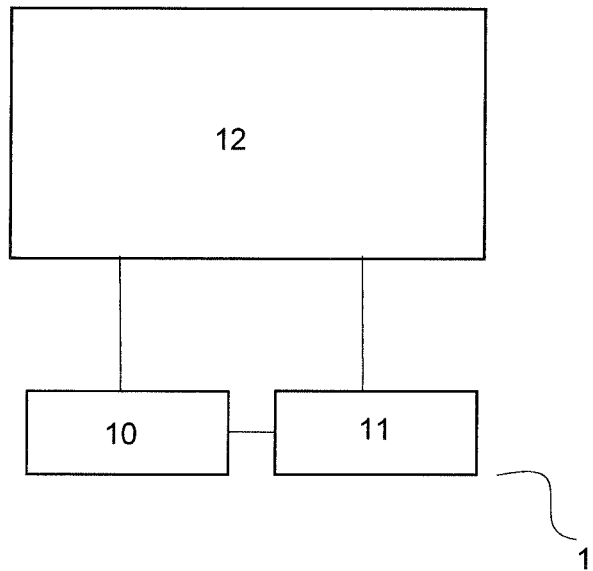
FIG. 1 illustrates a robot off-line programming apparatus 1 according to an embodiment of the invention.

FIG. 1 illustrates a robot off-line programming apparatus 1 according to an embodiment of the invention. As shown in FIG. 1, the robot off-line programming apparatus 1 as a whole comprises a processor 10, a memory 11 and a human-machine-interface 12. Although not shown in the figure, a keyboard, a mouse and the like are attached to perform editing, correcting, feeding, etc. of program data, parameter data, instructions, etc. for these parts of the robot off-line simulation apparatus through manual operation, when necessary. Further, the processor 10 overall controls on the individual parts of the robot on-line programming apparatus according to system programs, etc. stored in the memory 11. Further, the robot offline programming apparatus is arranged to be able to send and receive data to and from a CAD system, etc. through an appropriate input/output interface and communication lines (not shown). Program data, parameter data, etc. required for processing for obtaining information concerning target reachability, which will be described later, are stored in the memory 11. Start-up of the memory 11, and reading, writing, correcting, etc. of data are controlled by the processor 10.

Figure 2:
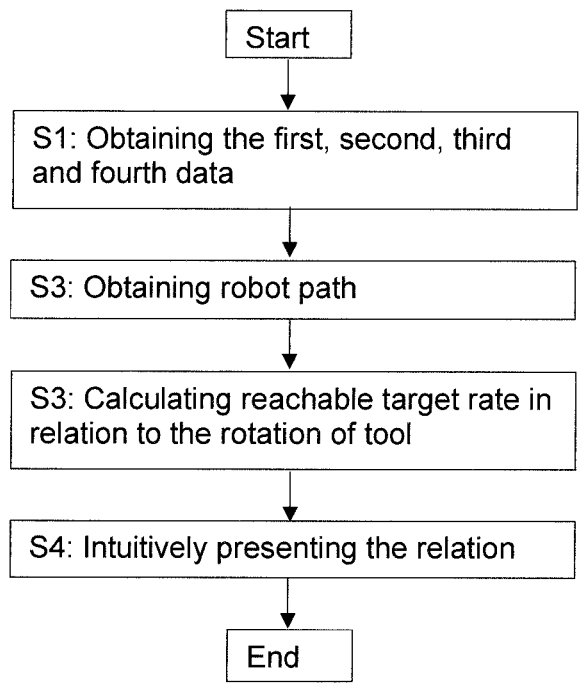
FIG. 2 is a flow chart showing the robot off-line programming method according to an embodiment of present invention.

FIG. 2 is a flow chart showing the robot off-line programming method according to an embodiment of present invention.

First, obtaining data about positions and orientations of the plurality of targets on at least one work piece, position of the at least one work piece, geometry of the at least one work piece, geometry of a tool, and the tool position and orientation with respect to an end of the robot (Step S1). The information represented by these data will be calculated for evaluation of the target reachability of a robot path.

Then, obtaining the robot path for which the tool tip passes through the plurality of the targets on the at least one work piece (Step S2). The robot path can be a result of calculation of the plurality of targets on the at least one work piece according to conventional path planning algorithm, or just be predetermined and input by the operator.

Next, calculation is performed in consideration of the data obtained in Step S1 to evaluate the target reachability with respect to generated robot path (Step S3).

Further, the results of the calculation is presented on the human-machine-interface (Step S4). Thus, the operator is able to intuitively know from what is displayed on the human-machine-interface about if the generated robot path is workable on the specific layout free of interference from the at least one work piece. By using the method and system according to present invention, the time and cost for building the robot system can be saved.

The above-mentioned steps will be described in detail below.

Description of Step S1:

In order to have sufficient information to assess the target reachability on a robot path, the following data are respectively fed to the robot off-line programming apparatus as shown in FIG. 1:

the first data representing positions and orientation of the plurality of targets on at least one work piece,
the second data representing position of the at least one work piece,
the third data representing geometry of a tool, and
the fourth data representing the tool position and orientation with respect to an end of the robot.

Description of Step S2:

A robot path for which the tool tip passes through the plurality of the targets on the at least one work piece is obtained, for which the target reachability is evaluated and described as below.

Description of Step S3:

Regarding the entire sequence of the multiple targets and the first through fourth data, an attempt to solve the inverse kinematics for the robot model is made. The solution to the inverse kinematics is found at how many of the targets on the obtained robot path are reachable to the tool in relation to various rotation angle of the tool around the tool axis within a predetermined range so as to comply with optimisation criteria. For example, the optimisation criteria concern with collision free robot path of the robot, and the predetermined range runs from −180 degrees to +180 degrees. A positive number indicates that the robot has a clockwise rotatory deviation from the original orientation and the negative number indicates a counter-clockwise rotatory deviation. It is to be noted that in the actual calculation of the inverse kinematics, addition or processing of information is needed depending on what data has been fed about the sequence of the targets. A brief explanation of this will be provided below.

With Above input, then we get the Fonvord Kinematics euqtion, in which, x1, x2, x3 . . . represent the joints values of the robot. By solving this equation, we then get the inverse kinematics of the robot, then get the joints values for each target on robot path, if there is no solution for specific target, then it is not reachable.

$$_{wrd}^{wobj}T \cdot _{wobj}^{tar[i]}T = _{wrd}^{rb}T \cdot _{rb}^{fla}T_{(x1,x2,x3 \ldots)} \cdot _{fla}^{tb}T \cdot _{tb}^{tcp}T$$

If there is series of target, so the translations of them should be:

$$_{wobj}^{tar[0]}T, _{wobj}^{tar[1]}T, _{wobj}^{tar[2]}T, _{wobj}^{tar[3]}T, _{wobj}^{tar[4]}T \ldots, _{wobj}^{tar[n]}T$$

Use the equation to find solutions for those targets, then we can get the readability percent by following calculation, $$\text{Reachability} = \frac{\text{Sum}_{solved}}{\text{Sum}_{all}} \times 100\%$$

Repeat above process for each angle setting, then we get all datas prepared for the line graph.

$_{wrd}^{wobj}T$: Translation from world coordinate frame to offline programming coordinate frame(named work object), this should be defined before starting offline programming, usually it is attached to the work piece, which is the second data defined in S1;

$_{wobj}^{tar[i]}T$: Translation from offline programming frame to target frame(means the position and orientation for targets in the path), this relates the first data defined in S1;

$_{wrd}^{rb}T$: Translation from word coordinate frame to robot base frame, this can be get after a robot layout is designed;

$_{rb}^{fla}T_{(x1,x2,x3 \ldots)}$: Forward Kinematics translation from robot base to flange frame;

$_{fla}^{tb}T$: Translation from flange frame to tool base frame, this relates to the fourth data as defined in S1

$_{tb}^{tcp}T$: Translation from tool base frame to tool center point frame, this relates to the third data as defined in S1.

Description of Step S4:

In order to intuitively presenting the outcome from the calculation as above, the calculation result concerning the relation is fed to the human-machine-interface and presented on it.

Figure 3:
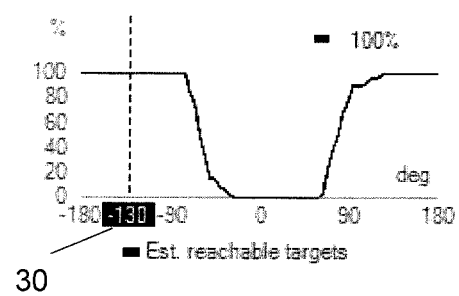
FIG. 3 illustrates a line graph intuitively showing the calculation result according to an embodiment of present invention.

FIG. 3 illustrates a line graph intuitively showing the calculation result according to an embodiment of present invention. As shown in FIG. 3, the relation between the rate of the plurality of targets that are reachable to the tool and the corresponding rotation of the tool around the tool axis is presented in a coordinate system on the human-machine-interface. A first axis of the coordinate system defines the tool rotation angle, and a second axis of the coordinate system defines the reachable target rate, where 100% means that all targets are reachable. The lower the rate is, the less targets could be reached.

A slider 30 is presented along the first axis of the coordinate system. Via the human-machine-interface, an operator can control the slider 30 to move to a certain tool rotation angle in the first axis. Based on the location of the slider 30, the human-machine-interface is adapted for distinguishing the robot reachable rate that relates to the tool rotation angle where the slider resides from the rest, for example as shown in FIG. 3, a vertical dash line appears starting from where the slider 30 stays. The line graph shows a clear trend of reachable target rates when the tool rotates to different angles.

When dragging the slider 30 on the first axis to a specific rotation angle, the reachable target rate is displayed accordingly. As shown in FIG. 3, when the tool rotates around the tool axis to an angle 130 degrees deviated from its original orientation, the reachable target rate is 100%, which means that all the targets could be reached when the robot processes at that orientation. At the same time, the robot position and orientation at the first target on the robot path can be previewed on the 3D graphics window, which provides the users an intuitive view.

When the slider 30 is dragged to an angle at which the target rate is not 100%, that means not all targets could be reached by the robot and users may change settings or change robot orientation adjustment strategy. The higher the rate is, the more targets could be processed and the less impossible the machining failure occurs.

As long as the reachable target rate could achieve 100% with the robot at a certain angle, it is considered that the robot path is available for machining. Otherwise, the settings must be modified.

With the automatic calculation and intuitive preview, users could get to know directly about how many targets can be processed actually on a robot path. If the reachability is unsatisfied, the users could also have chances to modify the settings to obtain a more reasonable and precise path. The relationship between the rotation angle of the robot and the reachable target rate could also facilitate the users to have a better known about how to effectively adjust the robot orientation. The preview function also help the users observe desired robot orientation. Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A robot off-line programming method, including:
respectively obtaining first data representing positions and orientations of a plurality of targets on at least one work piece, second data representing position of the at least one work piece, third data representing a geometry of a tool, and fourth data representing the tool position and orientation with respect to an end of the robot;
obtaining a robot path for which the tool tip passes through the plurality of targets on the at least one work piece;
using a function of inverse kinematics for a robot model in consideration of the first data, the second data, the third data and the fourth data, calculating how many of the plurality of targets on the obtained robot path are reachable to the tool in relation to various rotation angles of the tool around the tool axis within a predetermined range so as to comply with optimisation criteria; and
presenting a relation as a result of the calculation on a human-machine-interface.

2. The method according to claim 1, wherein:
the relation is presented in a graph on the human-machine-interface.

3. The method according to claim 2, wherein:
the relation is between a percentage of the plurality of targets that are reachable to the tool and the corresponding tool rotation angle.

4. The method according to claim 3, wherein:
a slider is presented along a first axis of the graph defining the tool rotation angle on the human-machine-interface;
via the human-machine-interface, the slider can be controlled to move to a certain tool rotation angle in the first axis; and
the human-machine-interface is adapted for distinguishing the robot reachable percentage that relates to the tool rotation angle where the slider resides from the rest.

5. The method according to claim 1, wherein:
the optimisation criteria concern with collision free movement of the robot.

6. The method according to claim 1, wherein:
the predetermined range runs from −180 degrees to +180 degrees.

7. A robot off-line programming apparatus, including:
a processor, a memory and a human-machine-interface, wherein the processor, the memory and the human-machine-interface are adapted to:
respectively obtain first data representing positions and orientations of a plurality of targets on at least one work piece, second data representing position of the at least one work piece, third data representing a geometry of a tool, and fourth data representing the tool position and orientation with respect to an end of the robot;
obtain a robot path for which the tool tip passes through the plurality of targets on the at least one work piece;
use a function of inverse kinematics for a robot model in consideration of the first data, the second data, the third data and the fourth data, calculate how many of the plurality of targets on the obtained robot path are reachable to the tool in relation to various rotation angles of the tool around the tool axis within a predetermined range so as to comply with optimisation criteria; and
present a relation as a result of the calculation on a human-machine-interface.

8. The method according to claim 2, wherein the optimisation criteria concern with collision free movement of the robot.

9. The method according to claim 3, wherein the optimisation criteria concern with collision free movement of the robot.

10. The method according to claim 4, wherein the optimisation criteria concern with collision free movement of the robot.

11. The method according to claim 2, wherein the predetermined range runs from −180 degrees to +180 degrees.

12. The method according to claim 3, wherein the predetermined range runs from −180 degrees to +180 degrees.

13. The method according to claim 4, wherein the predetermined range runs from −180 degrees to +180 degrees.

14. The method according to claim 5, wherein the predetermined range runs from −180 degrees to +180 degrees.

15. The apparatus according to claim 7, wherein the relation is presented in a graph on the human-machine-interface.

16. The apparatus according to claim 15, wherein the relation is between a percentage of the plurality of targets that are reachable to the tool and the corresponding tool rotation angle.

17. The apparatus according to claim 16, wherein:
a slider is presented along a first axis of the graph defining the tool rotation angle on the human-machine-interface;
via the human-machine-interface, the slider can be controlled to move to a certain tool rotation angle in the first axis; and
the human-machine-interface is adapted for distinguishing the robot reachable percentage that relates to the tool rotation angle where the slider resides from the rest.

18. The apparatus according to claim 7, wherein the predetermined range runs from −180 degrees to +180 degrees.

19. The apparatus according to claim 15, wherein the predetermined range runs from −180 degrees to +180 degrees.

20. The apparatus according to claim 16, wherein the predetermined range runs from −180 degrees to +180 degrees.

* * * * *